(12) United States Patent
Kim et al.

(10) Patent No.: US 8,505,939 B2
(45) Date of Patent: Aug. 13, 2013

(54) COUPLED TORSION BEAM AXLE

(75) Inventors: Byongcheol Kim, Seoul (KR); Seongho An, Seoul (KR); Sungjin Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 12 days.

(21) Appl. No.: 13/308,166

(22) Filed: Nov. 30, 2011

(65) Prior Publication Data

US 2013/0062850 A1 Mar. 14, 2013

(30) Foreign Application Priority Data

Sep. 8, 2011 (KR) .................. 10-2011-0091349

(51) Int. Cl.
*B60G 21/05* (2006.01)

(52) U.S. Cl.
USPC ...... 280/124.128; 280/124.106; 280/124.116; 280/124.126

(58) Field of Classification Search
USPC ............... 280/124.106, 124.107, 124.116, 280/124.125, 124.126, 124.128, 124.166
See application file for complete search history.

(56) References Cited

U.S. PATENT DOCUMENTS

| | | | | |
|---|---|---|---|---|
| 4,480,852 A | * | 11/1984 | Rumpel | 280/124.144 |
| 5,566,969 A | | 10/1996 | Tattermusch | |
| 6,152,467 A | | 11/2000 | Alesso et al. | |
| 6,352,272 B1 | * | 3/2002 | Lee | 280/124.134 |
| 6,719,311 B2 | * | 4/2004 | Davis et al. | 280/93.502 |
| 7,029,016 B2 | * | 4/2006 | Lin | 280/93.502 |
| 7,077,407 B2 | * | 7/2006 | Shin | 280/124.107 |
| 7,350,792 B1 | * | 4/2008 | Garman | 280/93.51 |
| 8,167,319 B2 | * | 5/2012 | Ogawa | 280/5.511 |
| 8,226,091 B2 | * | 7/2012 | Lee | 280/5.52 |
| 2004/0262985 A1 | * | 12/2004 | Nicolas | 301/124.1 |
| 2010/0052281 A1 | * | 3/2010 | Bitz et al. | 280/124.106 |

FOREIGN PATENT DOCUMENTS

| | | |
|---|---|---|
| JP | 62205813 A | 9/1987 |
| JP | 2002-2247 A | 1/2002 |
| JP | 2008-207771 A | 9/2008 |
| KR | 100313795 B1 | 10/2001 |
| KR | 10-0456881 B1 | 11/2004 |
| KR | 1020050122947 A | 12/2005 |
| KR | 1020060006797 A | 1/2006 |
| KR | 10-2007-0030995 A | 3/2007 |
| KR | 10-0716384 B1 | 5/2007 |

* cited by examiner

*Primary Examiner* — Joseph Rocca
*Assistant Examiner* — Darlene P Condra
(74) *Attorney, Agent, or Firm* — Morgan, Lewis & Bockius LLP

(57) ABSTRACT

A coupled torsion beam axle (CTBA) has improved compliance characteristics that can control a toe value of a rear wheel to be towed in during steering when the steering is performed in a simple structure. The CTBA includes trailing arms and carriers on which rear wheels are mounted via carrier brackets at both ends of a torsion beam, respectively, a center pipe penetrating in a longitudinal direction of a vehicle at the center of the torsion beam, and a steering rod of which one end is linked to the carrier and the other end is linked to the center pipe.

4 Claims, 6 Drawing Sheets

COUPLED TORSION BEAM AXLE

CROSS-REFERENCE TO RELATED APPLICATIONS

The present application claims the priority of Korean Patent Application Number 10-2011-0091349 filed Sep. 8, 2011, the entire contents of which application is incorporated herein for all purposes by this reference.

BACKGROUND OF INVENTION

1. Field of Invention

The present invention relates to a coupled torsion beam axle (CTBA) suspension which is one type of a suspension of a vehicle, and more particularly, to a CTBA with improved compliance characteristics that can control a toe value of a rear wheel in steering to be toed in during the steering with a simple structure.

2. Description of Related Art

A coupled torsion beam axle (CTBA) which is one type of a suspension of a vehicle has the small number of components, has excellent durability, and is easily serviced due to a simple structure and relatively more inexpensive than other suspension devices, and as a result, the CTBA is adopted primarily in a small-sized vehicle.

Referring to a substantial structure of the CTBA suspension mechanism, as shown in FIGS. 1 and 2, the CTBA includes a torsion beam 111, trailing arms 112 provided at both ends of torsion beam 111, and carriers 113 on which rear wheels RWs are mounted provided in trailing arms 112, respectively.

However, CTBA 100 has a structural characteristic in that rear wheels RWs are toed out when the vehicle turns round. Therefore, a rear wheel steering device may be provided in the CTBA as disclosed in a prior art document of KR 10-2006-0006796 in order to improve handling and driving stability. As shown in FIG. 1, when a side force Fs acts while the vehicle turns round, rear wheel RW receiving side force Fs is toed out in direction A as shown in FIG. 1 or when an outer wheel of rear wheel RW bumps (B) and thus an inner wheel rebounds (R), a toe value of rear wheel RW is toed out to damage steering stability. Therefore, the toe value of rear wheel RW needs to be controlled by using an actuator and a link member.

That is, the actuator and the link member that can control the toe value of the rear wheel are provided in the CTBA and a controller actuates the actuator according to a driving condition to control the toe value of the rear wheel.

However, as described above, since the technology that controls the toe value of the rear wheel through electronic control is expensive, the manufacturing cost of the vehicle is increased and a configuration is complicated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a coupled torsion beam axle (CTBA) with improved compliance characteristics that has a simple structure to enable a toe value of a rear wheel to be structurally toed in during steering by a link structure without complicated electronic control.

Various aspects of the present invention provide for a CTBA with improved compliance characteristics, which includes trailing arms and carriers on which rear wheels are mounted via carrier brackets, at both ends of a torsion beam, respectively, including a center pipe penetrating in a longitudinal direction of a vehicle at the center of the torsion beam; and a steering rod of which one end is linked to the carrier and the other end is linked to the center pipe.

The steering rod may be connected to the carrier by a ball joint.

One end of the steering rod may be connected to the carrier to be higher than the center pipe.

One end of the steering rod may be connected to the carrier in front of the center of the rear wheel.

Each of the steering rods may be sequentially connected to the center pipe by a pin joint, one end of the steering rod connected to a front side of the vehicle may be bent to a rear side of the vehicle, and one end of the steering rod connected to the rear side of the vehicle may be bent to a front side of the vehicle.

According to a CTBA with improved compliance characteristics according to various aspects of the present invention having the above configuration, a steering rod holds a rear wheel while bumping or steering in a simple structure to control the compliance characteristics of the CTBA, and as a result, a toe value of the rear wheel is toed in, thereby improving driving stability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
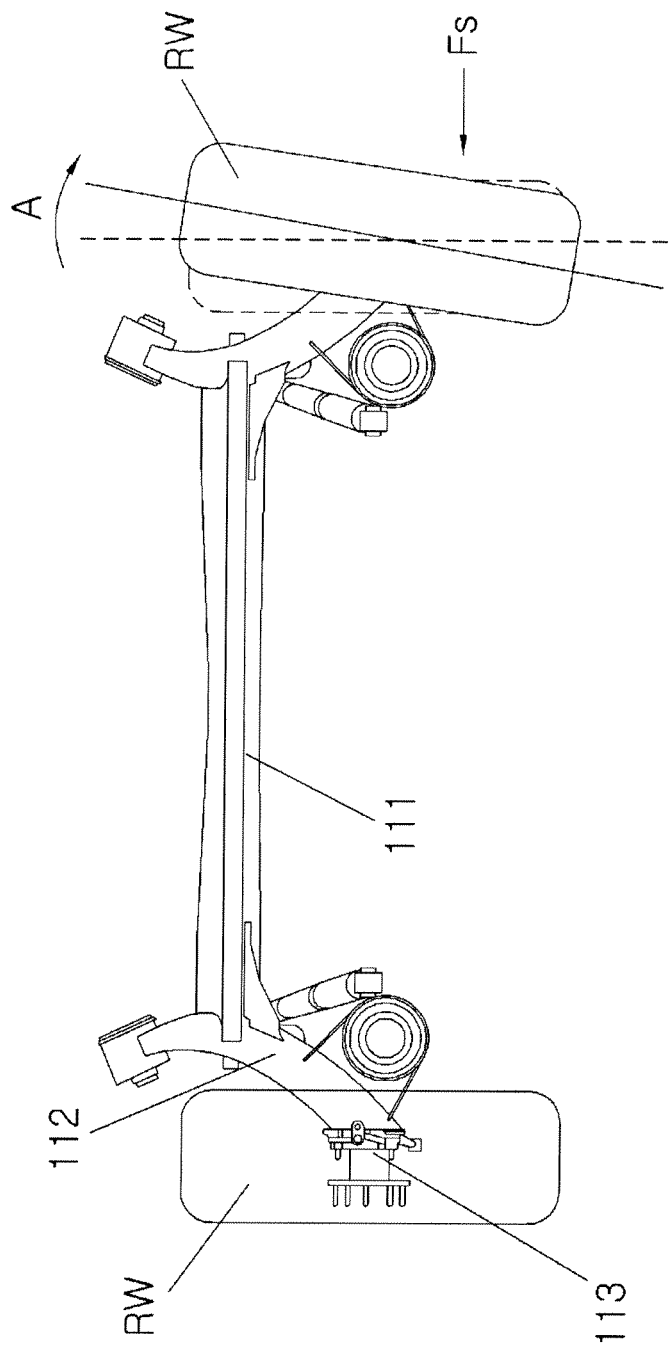
FIG. 1 is a plan view of a coupled torsion beam axle (CTBA) in the related art.
Figure 2:
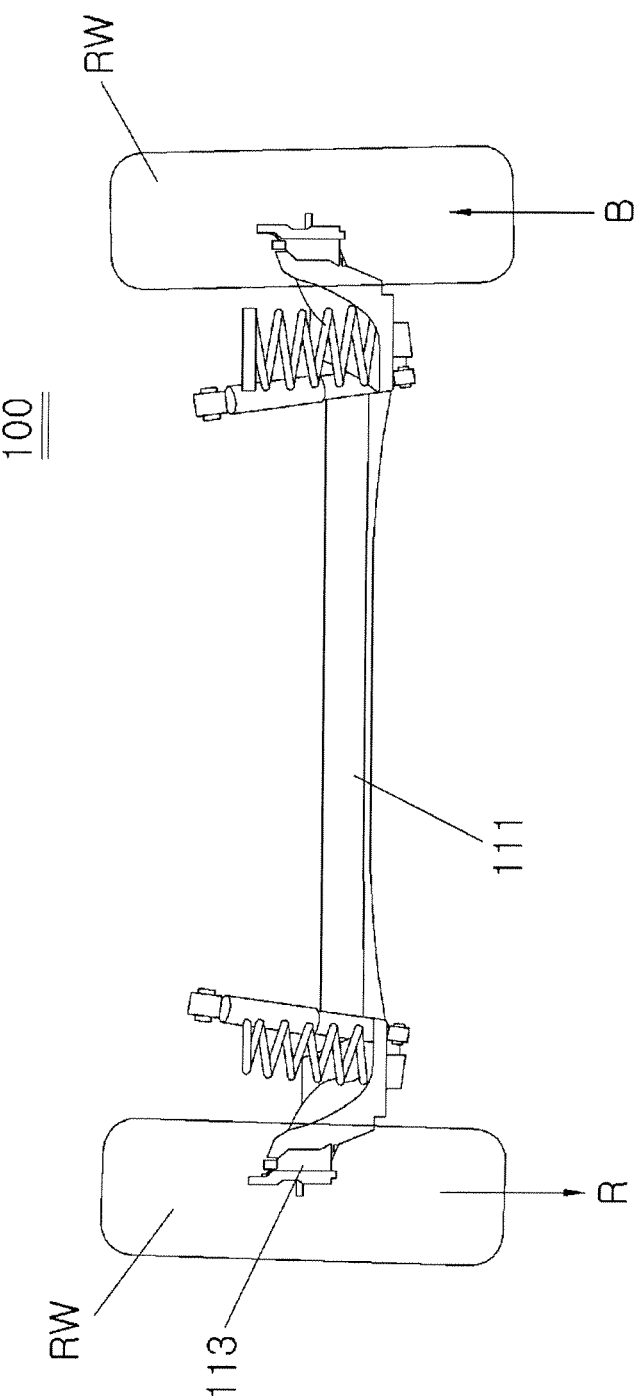
FIG. 2 is a rear view of a CTBA in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 3:
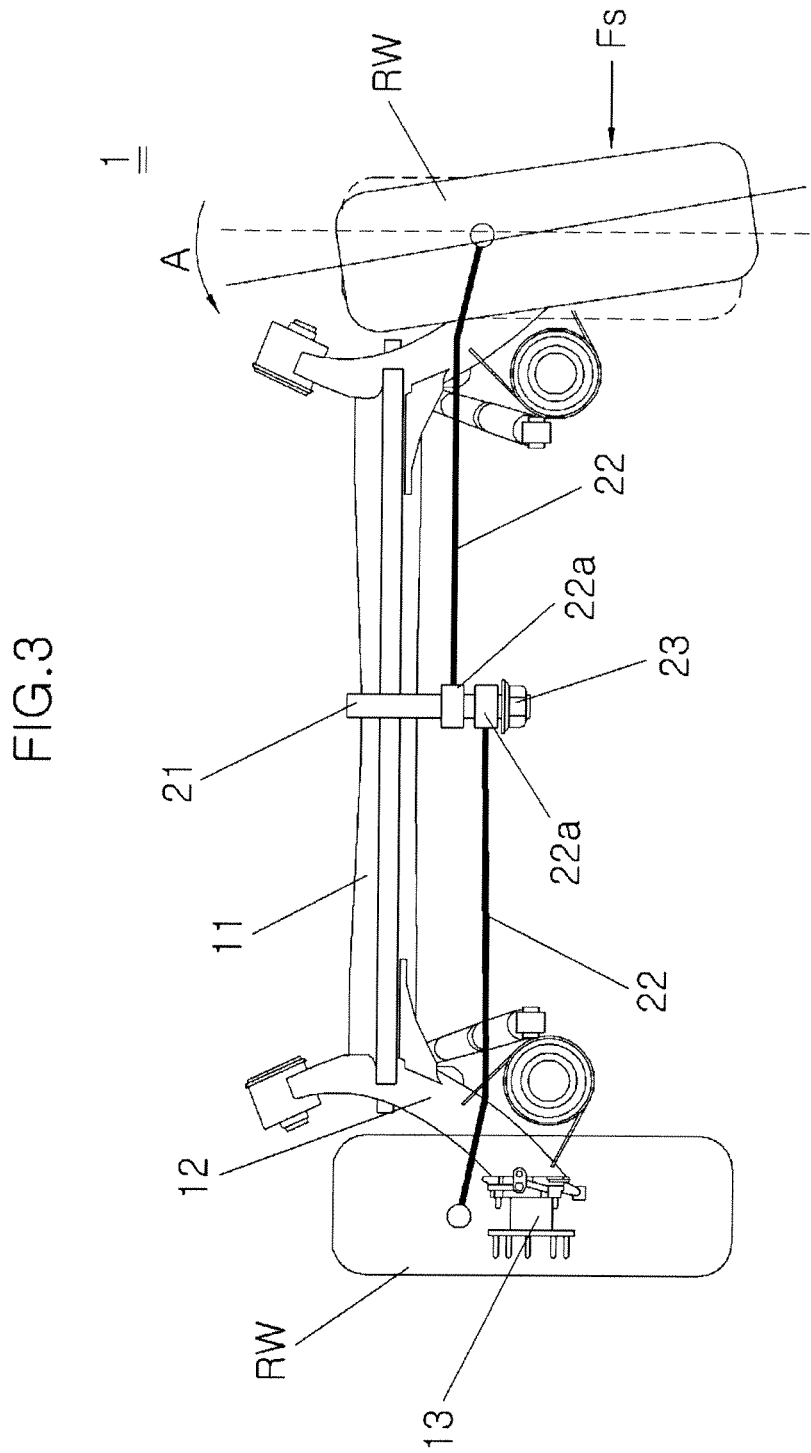
FIG. 3 is a plan view of an exemplary CTBA with improved compliance characteristics according to the present invention.
Figure 4:
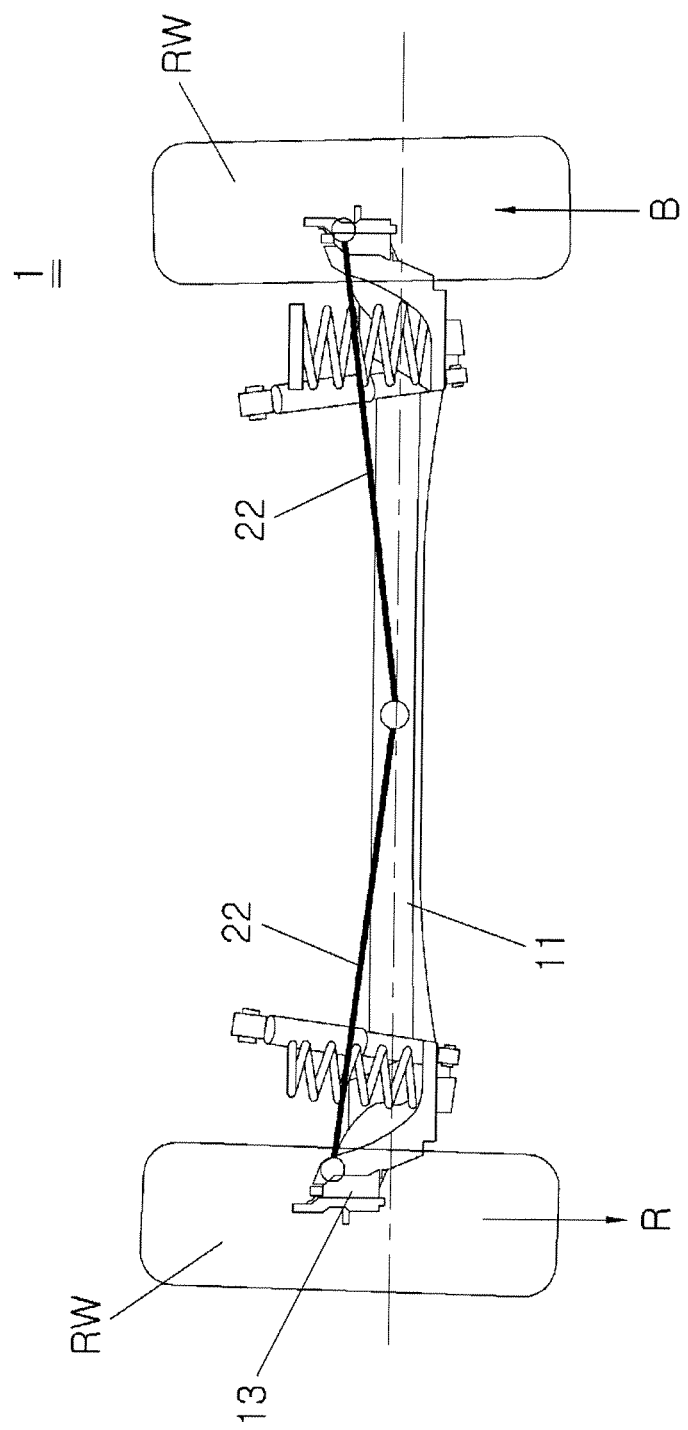
FIG. 4 is a rear view of an exemplary CTBA with improved compliance characteristics according to the present invention.

As shown in FIGS. 3 and 4, the CTBA 1 with improved compliance characteristics according to various embodiments of the present invention, which includes trailing arms 12 and carriers 13 on which rear wheels RWs are mounted via carrier brackets 14, at both ends of a torsion beam 11, respectively, includes a center pipe 21 penetrating in a longitudinal direction of a vehicle at the center of torsion beam 11 and a steering rod 22 of which one end is linked to carrier 13 and the other end is linked to center pipe 21.

Figure 6:
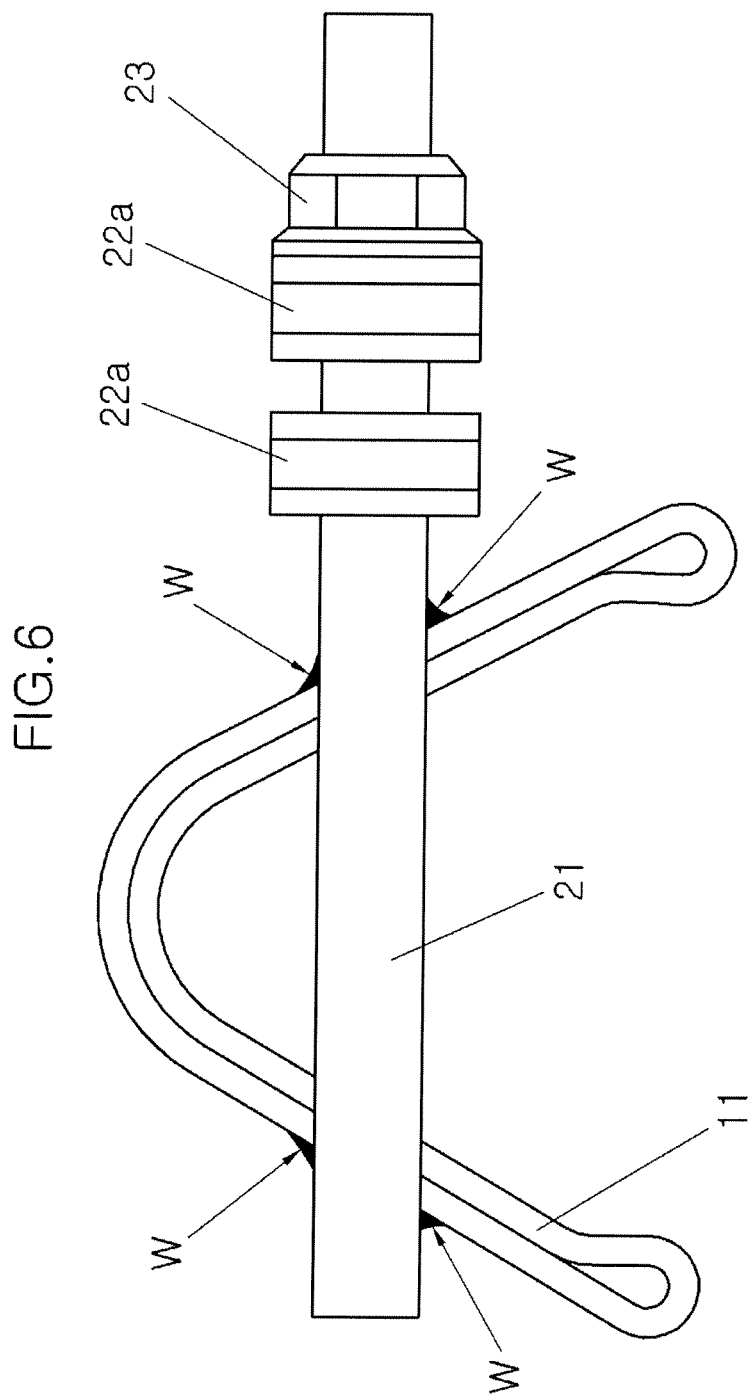
FIG. 6 is a diagram showing an assembly state of a center pipe in an exemplary CTBA with improved compliance characteristics according to the present invention.

Center pipe 21 is provided to penetrate torsion beam 11 of the CTBA. Center pipe 21 is provided to penetrate the center of torsion beam 11 in a direction vertical to torsion beam 11. That is, center pipe 21 is installed in the longitudinal direction of the vehicle. In this case, center pipe 21 penetrates torsion beam 11 and thereafter, torsion beam 11 and center pipe 21 are fixed by welding W portions of torsion beam 11 and center pipe 21 that contact with each other as shown in FIG. 6 so that torsion beam 21 is integrated with center pipe 21 without moving.

One end of steering rod 22 is linked to carrier 13 and the other end is linked to center pipe 21. Steering rod 22 is provided by a pair and one of steering rods is provided at each of left and right sides and controls a toe value of each of left and right rear wheels. One end of steering rod 22 is connected with carrier 13 with a ball joint or a bush and a bush 22a is formed at the other end, which is connected so that center pipe 21 penetrates bush 22a. In a pair of steering rods 22, since the other end of each steering rod 22 is connected to one center pipe 21 by a pin joint, the left steering rod and right steering rod are sequentially connected to center pipe 21 by the pin joint.

As described above, when both left and right steering rods 22 are connected to center pipe 21 by the pin joint, a engagement nut 23 is engaged to center pipe 21 outside to prevent steering rod 22 from being removed.

As described above, when a pair of steering rods 22 are linked substantially in parallel to with torsion beam 11, one end of steering rod 22, i.e., a portion where steering rod 22 and carrier 13 are connected with each other is positioned in front of a wheel center of the rear wheel and positioned above torsion beam 11, in order to secure steering stability.

Figure 5:
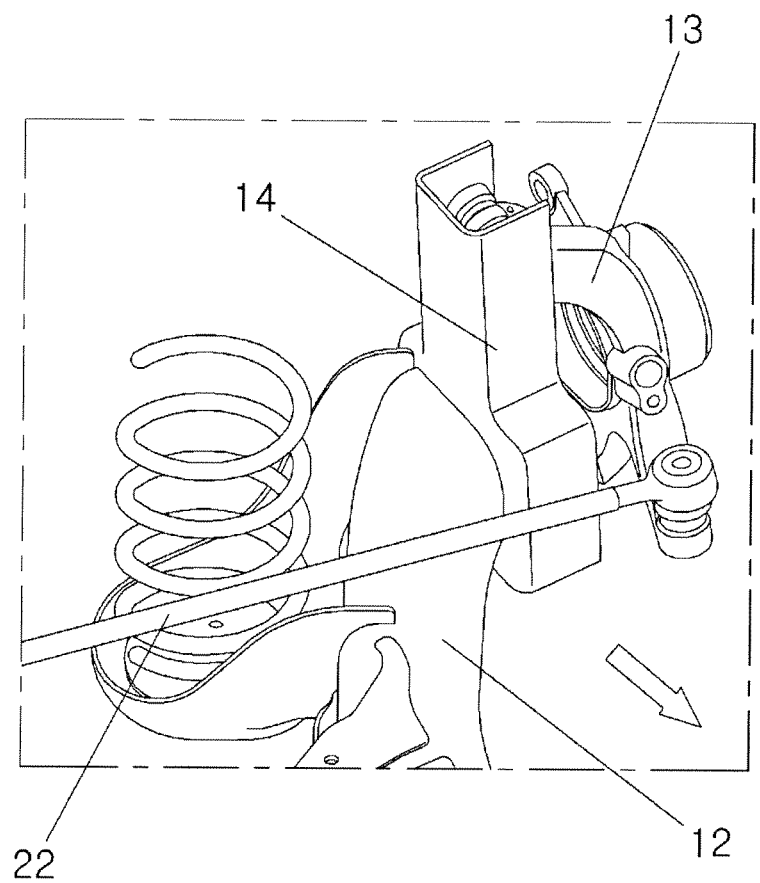
FIG. 5 is an enlarged perspective view of a part of an exemplary CTBA with improved compliance characteristics according to the present invention.

As shown in FIGS. 3 and 5, when steering rod 22 is connected to carrier 13, steering rod 22 is connected to carrier 13 in front of the wheel center of the rear wheel in a vehicle driving direction. That is, as shown in detail in FIG. 5, when steering rod 22 is connected to carrier 13, steering rod 22 is connected to carrier 13 in front of the wheel center of rear wheel RW in the vehicle driving direction (an arrow of FIG. 5). Meanwhile, since one end of steering rod 22 is sequentially connected to center pipe 21, the other end of steering rod 22 is bent and one end of steering rod 22 connected to center pipe 21 by the pin joint in a front portion of center pipe 21 is bent to a rear side of the vehicle and the other end of steering rod 22 connected with center pipe 21 in a rear portion of center pipe 21 by the pin joint is bent to a front side of the vehicle.

As described above, since one end of steering rod 22 is connected with center pipe 21 in front of the wheel center of rear wheel RW in the vehicle driving direction, when rear wheel RW is bumped (B), one end of steering rod 22 pulls the front portion of rear wheel RW to toe in the rear wheel.

As shown in FIG. 4, when steering rod 22 is connected to carrier 13, one end of steering rod 22 is connected at a position higher than torsion beam 11 to toe in the rear wheel by pulling the rear wheel while bumping. Since one end of steering rod 22 placed outside CTBA 1 is high, pair of steering rods 22 are placed in like a 'V' shape. As a result, when an outer wheel is bumped (B), steering rod 22 pulls the outer rear wheel to allow a toe value of rear wheel RW to be toed in.

As described above, steering rod 22 is provided in the CTBA in parallel to torsion beam 11, such that steering rod 22 holds rear wheel RW to control toe-out of rear wheel RW when the vehicle turns round or the rear wheel is bumped, such that rear wheel RW faces the inner part of rear wheel RW to allow rear wheel RW to be toed in.

Accordingly, the compliance characteristics of CTBA 1 are improved when the vehicle is steered or bumped to improve the driving stability.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle (CTBA) with improved compliance characteristics for a vehicle, the CTBA comprising:
    trailing arms and carriers on which rear wheels are mounted via carrier brackets, at both ends of a torsion beam, respectively;
    a center pipe extending in a longitudinal direction of the vehicle at a center of the torsion beam; and
    a steering rod including one end linked to the carrier and another end linked to the center pipe;
    wherein one end of the steering rod is connected to the carrier forward of a center of the rear wheels.

2. The CTBA as defined in claim 1, wherein the steering rod is connected to the carrier by a ball joint or a bush.

3. The CTBA as defined in claim 1, wherein the one end of the steering rod is connected to the carrier at a position higher than the center pipe.

4. The CTBA as defined in claim 1, wherein:
    each of the steering rods is sequentially connected to the center pipe by a pin joint,
    one end of the steering rod connected to a front side of the vehicle is bent to a rear side of the vehicle, and
    one end of the steering rod connected to the rear side of the vehicle is bent to a front side of the vehicle.

* * * * *